(12) United States Patent
Wakitani et al.

(10) Patent No.: US 7,420,309 B2
(45) Date of Patent: Sep. 2, 2008

(54) SPINDLE MOTOR

(75) Inventors: Akihiko Wakitani, Ozu (JP); Masahiro Jyono, Saijyo (JP); Takao Yoshitsugu, Kita-gun (JP); Yoshihiro Ashizaki, Hirakata (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 11/987,342

(22) Filed: Nov. 29, 2007

(65) Prior Publication Data

US 2008/0129139 A1 Jun. 5, 2008

Related U.S. Application Data

(62) Division of application No. 11/293,078, filed on Dec. 5, 2005, now Pat. No. 7,321,178.

(30) Foreign Application Priority Data

Dec. 8, 2004 (JP) ............................. 2004-355935

(51) Int. Cl.
  *H02K 1/14* (2006.01)
  *H02K 21/14* (2006.01)
  *H02K 21/22* (2006.01)
(52) U.S. Cl. ..................... 310/216; 310/67 R; 310/254; 360/99.08
(58) Field of Classification Search ............. 310/67 R, 310/216, 217, 254; 360/98.07, 99.04, 99.06, 360/99.07, 99.08
See application file for complete search history.

(56) References Cited

U.S. PATENT DOCUMENTS 3,845,340 A * 10/1974 Brooks et al. ............... 310/217
4,949,000 A * 8/1990 Petersen ..................... 310/179
5,694,268 A 12/1997 Dunfield
5,859,486 A 1/1999 Nakahara et al.
6,759,784 B1 7/2004 Gustafson et al.
7,190,549 B2 * 3/2007 Byun et al. ............... 360/99.08
7,321,178 B2 * 1/2008 Wakitani et al. ............ 310/216
2004/0090701 A1 5/2004 Byun et al.
2006/0103248 A1 5/2006 Tamaoka

FOREIGN PATENT DOCUMENTS

JP    2000041349 A  *  2/2000
JP    2000083354 A  *  3/2000
JP    3052540          4/2000
JP    2000270504 A  *  9/2000
JP    2004-166497      6/2004
JP    2006-158188      6/2006

* cited by examiner

*Primary Examiner*—Tran Nguyen
(74) *Attorney, Agent, or Firm*—Wenderoth, Lind & Ponack, L.L.P.

(57) ABSTRACT

In a spindle motor in which teeth portions of a stator core formed by laminating magnetic plates are bent in order to increase the number of turns of the stator windings, a gap in the teeth portions between the magnetic plates is avoided and a precise attractive force adjustment becomes possible. The stator core is bent such that its teeth portions faces a surface of a rotor magnet at right angles, and the teeth portions and salient pole arm portions around which windings are wound are substantially parallel to each other. The salient pole arm portions locate approximately halfway between a lower surface of a hub and an upper surface of a base. Further, a thickness of a magnetic plate is set to be 0.5 to 0.9 times that of other portions.

4 Claims, 15 Drawing Sheets

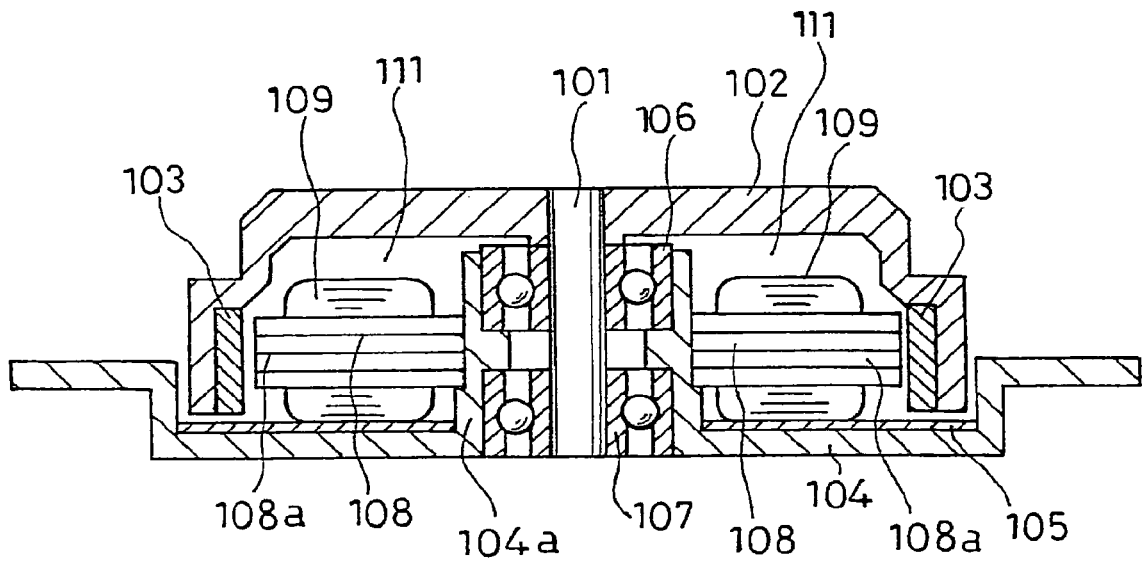
PRIOR ART
*Fig. 13*
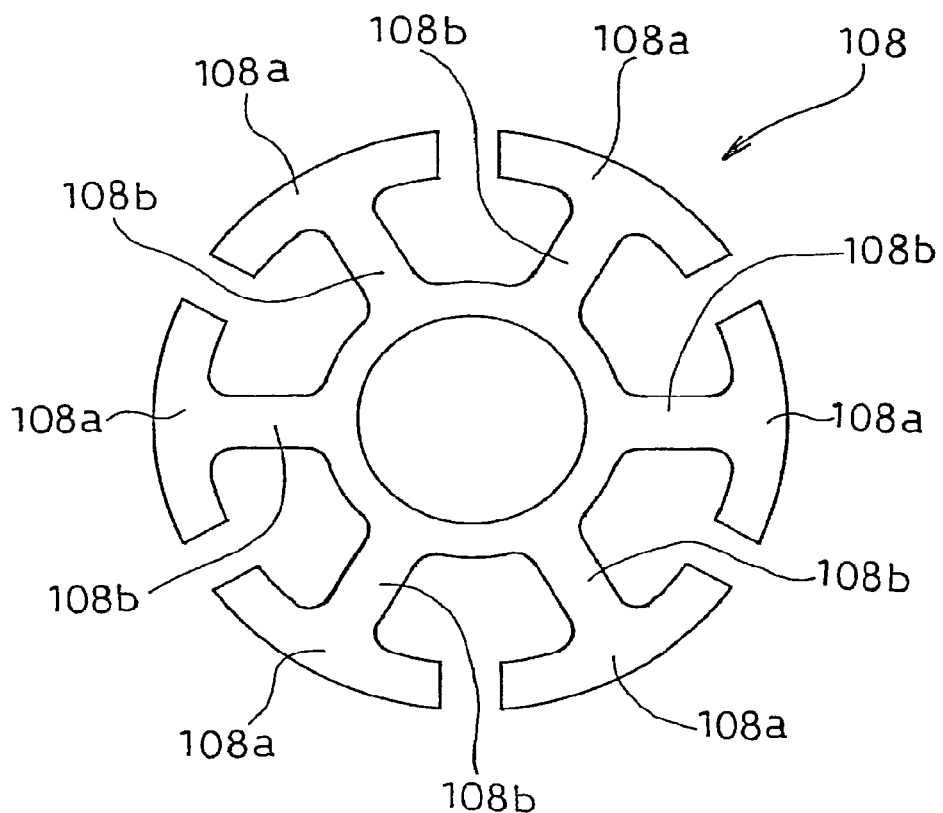
PRIOR ART  *Fig. 14*

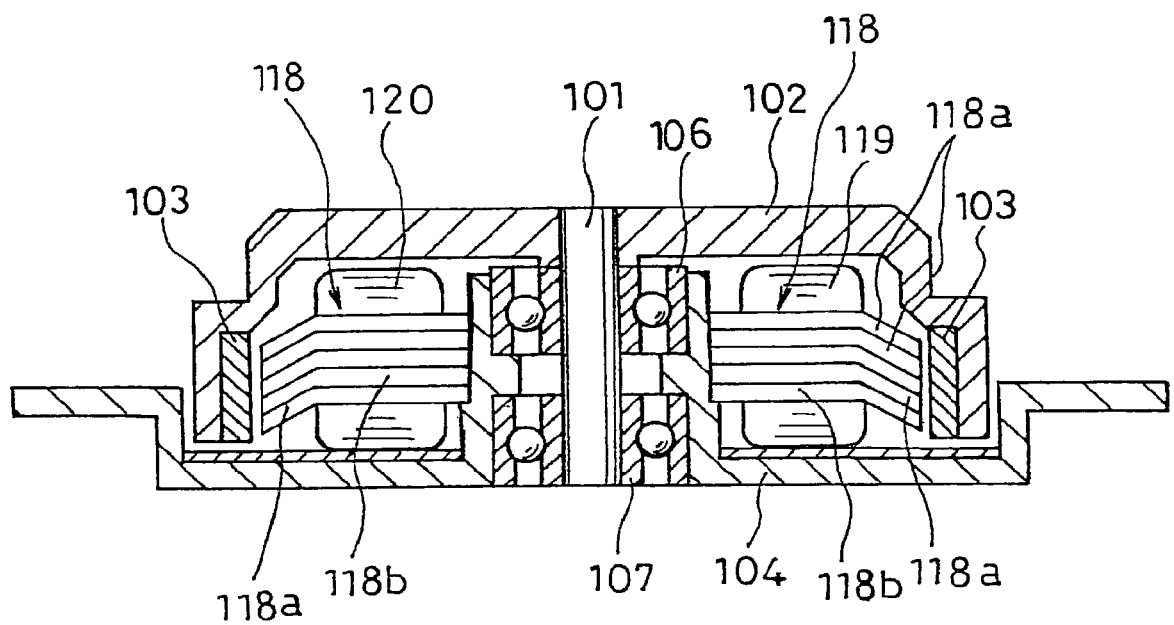
PRIOR ART  *Fig. 15a*
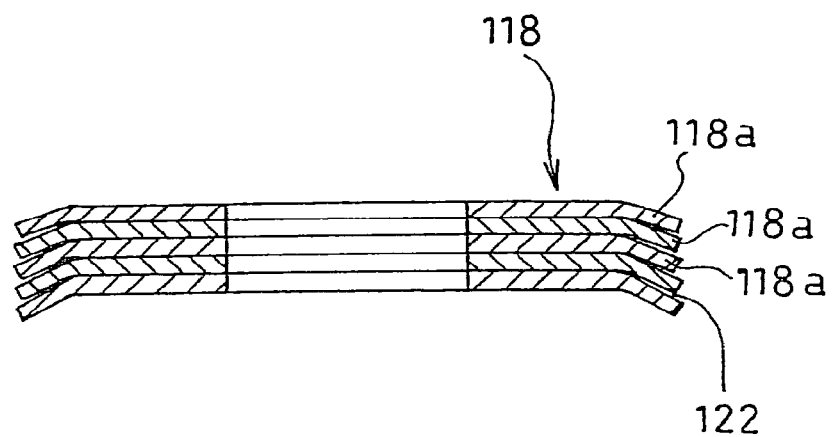
PRIOR ART  *Fig. 15b*

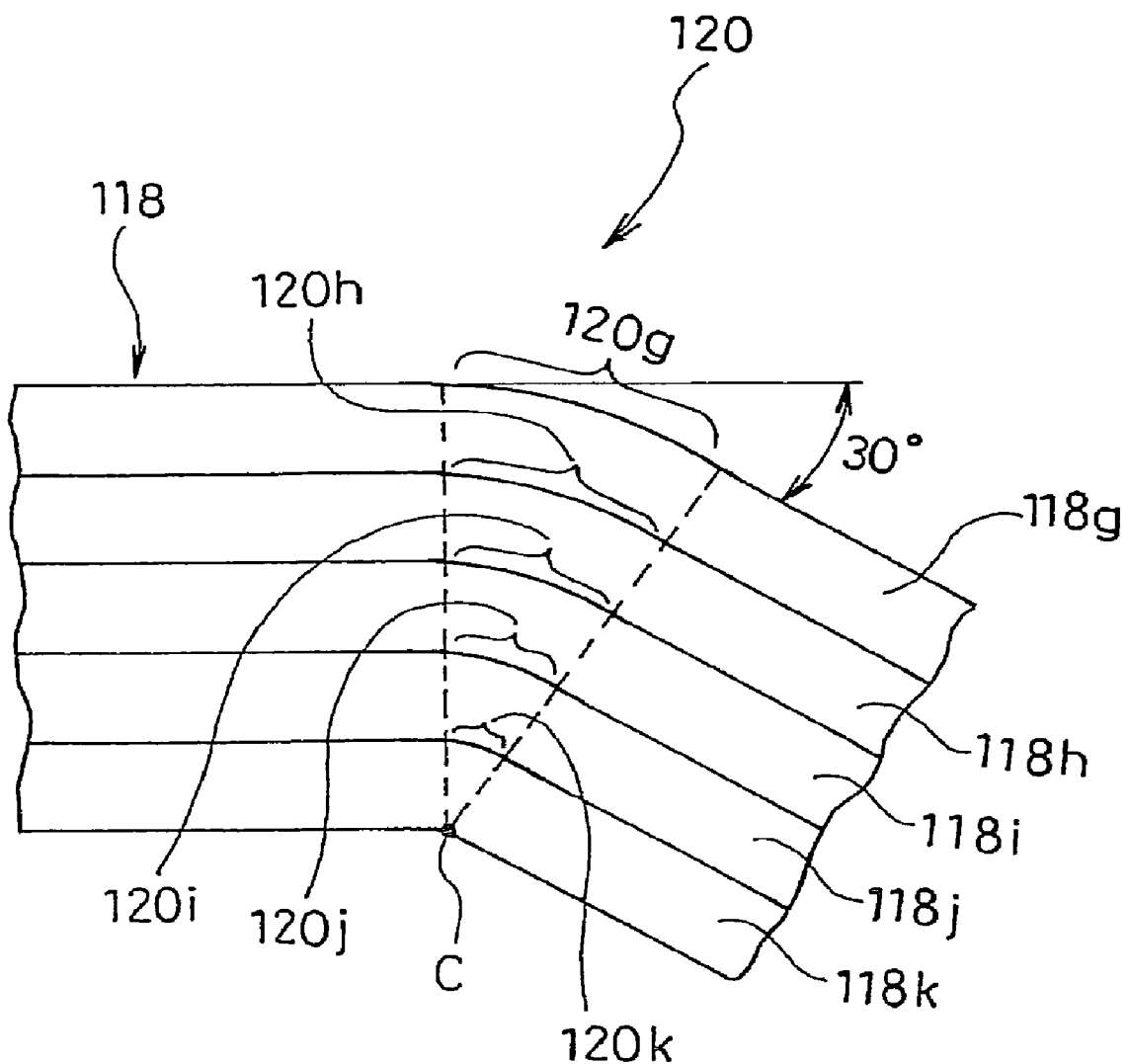
PRIOR ART  *Fig. 16*

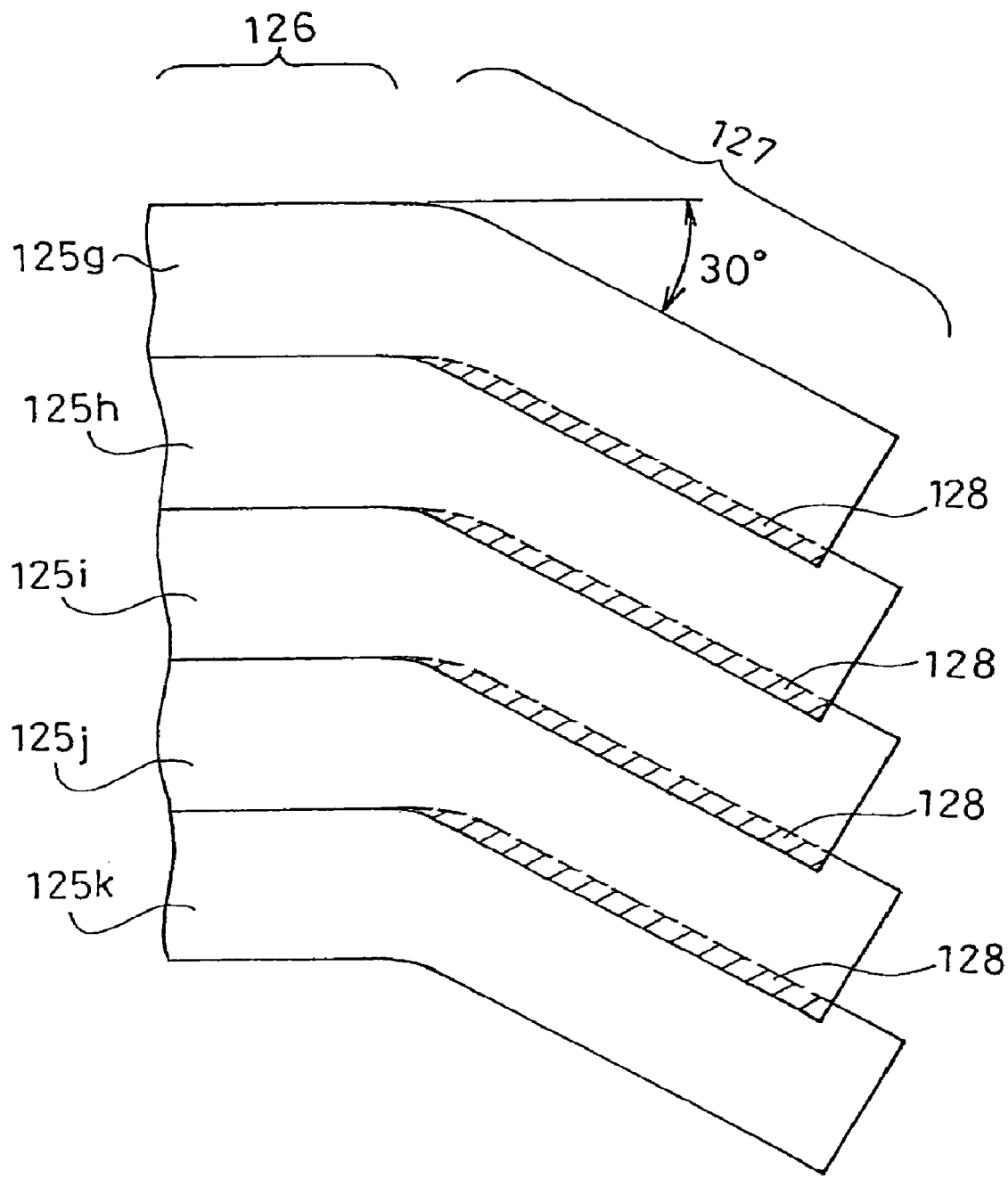
PRIOR ART  *Fig. 17*

SPINDLE MOTOR

This is a Rule 1.53(b) Divisional application of Ser. No. 11/293,078, filed Dec. 5, 2005 now U.S. Pat. No. 7,321,178.

BACKGROUND OF THE INVENTION

1. Field of the Invention

The present invention relates to a spindle motor for rotating magnetic discs, optical discs and the like, and a brushless motor having a structure similar to that of the spindle motor.

2. Description of the Related Art

In recent years, electronic equipment is becoming smaller and smaller. Thus, there is a growing demand for hard disc drives (HDDs) incorporated therein to become smaller and thinner. For example, until few years ago, HDDs for discs having a diameter of 3.5 inches or 2.5 inches had been used commonly. However, recently, HDDs for discs having a diameter of 1.8 inches or smaller, that is, 1 inch or 0.85 inches are becoming popular. When the disc diameter is reduced, motors such as spindle motors, brushless motors and the like for rotating the disc also have to become smaller and thinner. A reduction in size and thickness of motors is required not only in the field of HDDs but also in many other fields. As HDDs become faster, smaller and thinner, motors are required to rotate with a higher precision, lower vibration, and less noise. Thus, the type of a bearing used in motors is shifted from a conventional ball bearing to a hydrodynamic bearing. The hydrodynamic bearings float and rotate rotors without being in contact therewith by using a pumping force generated by fluid through a dynamic pressure generating groove. Therefore, it is necessary to pull the rotor to a stator in an axial direction with a certain force in order to prevent the rotor from moving in an axial direction and changing its position when a position of the motor is changed. In general, such an attractive force is obtained by two means.

The first means is a method of generating an attractive force between a rotor and a stator by utilizing a magnetic force applied by a rotor magnet to the stator by providing a magnetic member on a stator side of the motor or forming the stator side of the motor of a magnetic material.

The second means is a method of obtaining an attractive force in an axial direction by shifting magnetic centers of a rotor magnet and a stator core of the motor in the axial direction such that a magnetic force of the rotor magnet is generated to the stator side.

In general, the former means is used to obtain most of an attractive force and the latter means is used to achieve fine adjustment of the attractive force. If the attractive force is small, the rotor floats by a large amount. The rotor may float beyond a permissible limit of an upward movement in the bearing and come into contact with other components. An anti-vibration property of the whole device may also deteriorate. If the attractive force is large, the rotor floats by a small amount. When an amount of the oil is decreased in the later stage of the life of the bearing, the life may be shortened due to a bearing contact. In addition, vibration and noise of a spindle motor are also affected by the shift length of the magnetic centers.

Therefore, for a spindle motor employing a fluid bearing, an attractive force has to be adjusted and designed more precisely.

A brushless spindle motor, which is a first conventional example of a motor having a reduced size and thickness, will be described with reference to FIG. 13.

FIG. 13 is a cross-sectional view of the first conventional example, a brushless motor of an external rotor type described in Japanese Patent Gazette No. 3052540. In FIG. 13, ball bearings 106 are provided in a bearing support 104a in a central portion of a housing 104 having a plate-like shape. A shaft 101 with a rotor yoke 102 fixed thereto is fitted into a hole defined by inner ring 107 of the ball bearings 106. On an inner surface of the outer peripheral portion of the rotor yoke 102, a rotor magnet 103 is provided.

A stator core 108 of the stator is provided on the housing 104. The stator core 108 has projecting teeth portions (salient pole teeth portions) 108a in its outer peripheral portion as shown in a plain view of FIG. 14. The stator core 108 is attached to the housing 104 such that the projecting teeth portions 108a oppose the rotor magnet 103. The stator core 108 is formed by laminating multiple layers of thin magnetic plates punched into the shape shown in FIG. 14. A conducting wire is wound around salient pole arm portions 108b of the stator core 108 to form windings 109. In the stator core 108 of FIG. 14, winding 109 is formed for each of six salient pole arm portions 108b. The six windings 109 are connected as Y connection or Δ connection, for example, in the case of a three-phase motor. When a current flows through the windings 109, an electromagnetic force is generated between the stator core 108 and the rotor magnet 103, causing the rotor yoke 102 and the shaft 101 to rotate in a predetermined direction.

In order to obtain a brushless motor with a high torque, generally, it is necessary to increase a magnetic force of the rotor magnet 103, or the number of turns of the respective windings 109. However, in the structure of FIG. 13, the number of turns can be increased only to an extent that the lower end surfaces of the windings 109 come into contact with an insulating plate 105, which is a print substrate or the like provided on an upper surface of the housing 104. In such a state, a space 111 between the rotor yoke 102 and an upper surface of the windings 109 remains a spare space which is not fully utilized.

Japanese Patent Gazette No. 3052540 discloses a second conventional example obtained by improving the brushless motor shown in FIG. 13 to make full use of the space 111 between the rotor yoke 102 and the upper surfaces of the windings 109. FIG. 15A is a cross-sectional view of a brushless motor of the second conventional example. In FIG. 15A, the same elements as those shown in FIG. 13 are denoted by the same reference numerals, and the descriptions thereof are omitted.

In the brushless motor shown in FIG. 15A, the shape of a stator core 118 is different from that of the stator core 108 of the first conventional example. Specifically, the stator core 118 includes salient pole arm portions 118b and projecting teeth portions 118a which have the same planar shape as those of the salient pole arm portions 108b and the projecting teeth portions 108a of FIG. 14 but are different in that the projecting teeth portions 118a are bent downward in boundary portions between the salient pole arm portions 118b and the projecting teeth portions 118a as shown in FIG. 15. Since the projecting teeth portions 118a are bent downward, the entire stator core 118 can be moved away from the housing 104 in an upward direction and a gap between the lower end surface of the stator core 118 and the housing 104 can be made larger with the tips of the projecting teeth portions 118a facing the rotor magnet 103. With such a structure, the number of turns of the respective windings 119 can be larger than the number of turns of the windings 109 of the first conventional example. As a result, the space 111 between the stator core 118 and the rotor yoke 102 can be effectively used to achieve a stator having the windings 119 with large number of turns without changing the size of the entirety of the brushless motor.

The second conventional example of the brushless motor has following two problems.

The first problem is as follows. Since the projecting teeth portions (salient pole teeth portions) 118a of the stator core 118 are bent, the cross sections of the projecting teeth portions 118a of multiple core sheets forming the stator core 118 are not perpendicular but diagonal to the inner peripheral surface of the rotor magnet 103. When the projecting teeth portions 118a oppose to the rotor magnet 103 diagonally, an air gap between the rotor magnet 103 and the projecting teeth portions 118a expands substantially. Thus, a magnetic resistance is increased and an operational point of the rotor magnet 103 is lowered. Torque constant Kt (a value represented by a ratio of torque to current) is lowered.

Further, a position of the magnetic center of the stator core is difficult to be determined. A variance in the magnetic centers among the motors becomes large. Thus, there is large variance in attractive forces and motor properties such as an amount of floating and the life are not stabilized.

The second problem is due to a method for producing the stator. In order to produce the stator core 118 having the bent projecting teeth portions 118a, usually, core sheets are first laminated and then the laminated core sheets are collectively subjected to a bending working, or core sheets are first formed into a shape shown in FIG. 14 by a press working (punching), the projecting teeth portions 118a are bent by a bending working (process by a plastic deformation), and then the bent core sheets are laminated to produce the stator core 118. When the stator core 118 is produced by the former method, a large pressing force may be required depending upon the number of laminated layers. When the stator core 118 is produced by the latter method, the core sheets do not adhere closely to each other in the tip portions of the projecting teeth portions 118a, and small gaps 122 may be generated between the core sheets as shown in FIG. 15B. Thus, when the current flows through the windings 119, the projecting teeth portions 118a may vibrate, generating a noise. Furthermore, leakage flux from the stator core 118 increases and the magnetic property deteriorates. This increases power loss. It is also difficult to predict where the magnetic center of the stator core is, and a variance in the magnetic centers among the motors becomes large. Therefore, there is a large variance in attractive forces and the motor properties such as an amount of floating, the life, and the like are not stabilized.

The gaps between the projecting teeth portions 118a of the core sheets described above are generated for the following reasons. When the projecting teeth portions 118a of the plurality of core sheets are bent to form the stator core 118, for example, a flexural center C is set in a lower portion of the stator core 118 as shown in FIG. 16. Bent areas 120 of five core sheets 118g, 118h, 118i, 118j, and 118k are varied as shown in FIG. 16 with the largest being the bent area 120g of the core sheet 118g and the smallest being the bent area 120k of the core sheet 118k. If the core is formed as described above, no gap is formed between the laminated core sheets 118g through 118k. However, for varying the bent areas of the core sheets 118g through 118k, one bending mold is required for each of the core sheets 118g through 118k. If one mold is used for all the core sheets, a large strong bending working machine is required and a process cost is increased significantly.

Usually, the core sheets 118g through 118k are formed with one mold. Thus, the core sheets having the same bent area are laminated. FIG. 17 shows a laminate of a plurality of core sheets 125g through 125k formed with one mold. FIG. 17 is a partial cross-sectional view of laminated core sheets 125g, 125k, 125i, 125j, and 125k. As shown in FIG. 17, the core sheets 125g through 125k have planar portions 126 and bent portions 127. The bent portions 127 are formed by bending the right end portions of the core sheets 125g through 125k which have originally had a plate shape by, for example, thirty degrees with one mold. As shown in FIG. 17, when it is tried to laminate the core sheets 125g through 125k with the internal diameter sides of the planar portions 126 thereof being aligned and adhering closely to each other, the bent portions 127 of adjacent core sheets, for example, the core sheets 125g and 125h, overlap each other as shown by a shaded overlap portion 128. Actually, the core sheets 125g and 125h cannot overlap each other in the overlap portion 128. Thus, when the core sheets 125g and 125h are adhered closely to each other in the planar portions 126, they press each other in the bent portions 127 and a gap is generated in tip portions as shown in FIG. 15B. The same is also true of other core sheets 125i through 125k.

SUMMARY OF THE INVENTION

An object of the present invention is to provide a spindle motor having a stator core with its salient pole teeth portions being bent but no gap is produced between the salient pole teeth portions facing a rotor magnet.

According to one aspect of the present invention, there is provided a spindle motor comprising: a rotor magnet supported by a hydrodynamic bearing device so as to be rotatable; a stator core formed by laminating a plurality of thin magnetic material plates which have salient pole teeth portions facing the rotor magnet with a predetermined gap interposed therebetween and salient pole arm portions which are connected to the salient pole teeth portions and around which windings are wound; and windings wound around the salient pole arm portions of the stator core, wherein the thin plates of the magnetic material of the stator core have the salient pole teeth portions facing an opposing surface of the rotor magnet substantially perpendicularly, being bent at bent portions between the salient pole teeth portions and the salient pole arm portions such that the salient pole teeth portions and the salient pole arm portions are substantially parallel, and a thickness of the bent portions of the thin plates is made thinner than that of other portions.

According to the present invention, since bent core sheets (thin magnetic plates) are laminated to form a stator core, salient pole teeth portions of the stator core face a surface of the rotor magnet substantially perpendicularly while keeping winding space sufficiently. Thus, magnetic force lines of the rotor magnet pass through the stator core at right angles and the magnetic force of the rotor magnet effectively influence rotational power. In bent portions, a thickness of the core sheet is made thinner than that of other portions. Thus, when the stator core is formed by laminating the core sheets, the tip portions of the salient pole teeth portions do not spread out and no gap is generated between the core sheets.

According to another aspect of the present invention, there is provided a spindle motor comprising: a rotor magnet supported by a hydrodynamic bearing device so as to be rotatable; a stator core formed by laminating a plurality of thin magnetic material plates which have salient pole teeth portions facing the rotor magnet with a predetermined gap interposed therebetween, salient pole arm portions which are connected to the salient pole teeth portions, and a yoke portion connected to the salient pole arm portions and fixed to a base; and windings wound around the salient pole arm portions of the stator core, wherein the thin plates of the magnetic material of the stator core have the salient pole teeth portions facing an opposing surface of the rotor magnet substantially perpendicularly, being bent at first bent portions between the salient pole teeth portions and the salient pole arm portions such that the salient pole teeth portions and the salient pole arm portions are substantially parallel, and a thickness of the first bent portions of the thin plates is made thinner than that of other portions, and the thin plates are bent at second bent portions between the yoke portions and the salient pole arm portions such that the yoke portion and the salient pole arm portions are substantially parallel, and a thickness of the second bent portions of the thin plates is made thinner than that of other portions.

According to the present invention, the stator core is formed by laminating core sheets bent at first bent portions and second bent portions. Since the core sheets are bent at the first bent portions, the salient pole teeth portions face a surface of a rotor magnet substantially perpendicularly. Thus, magnetic force lines of the rotor magnet pass through the stator core at right angles and the magnetic force of the rotor magnet effectively influences rotational power. Further, since the core sheets are bent at the second bent portions, the salient pole arm portions can be set at a desirable position to maximize the number of turns of the coil. In the first and second bent portions, a thickness of the core sheet is made thinner than that of other portions. Thus, when the stator core is formed by laminating the core sheets, the tip portions of the yoke portions and the salient pole teeth portions do not spread out and no gap is generated in yoke portions and the salient pole teeth portions between the core sheets.

According to the present invention, a stator core is bent in bent portions between salient pole arm portion around which windings are wound and salient pole teeth portions facing a rotor magnet. With such a structure, the salient pole arm portions can be disposed at an approximately halfway between the base and the hub. In this way, a spindle motor having an increased number of turns of the windings wound around the salient pole arm portions and a high torque can be achieved.

In the bent portions, the stator core is bent such that the salient pole teeth portions and the salient pole arm portions are parallel to each other. Thus, the salient pole teeth portions face a surface of the magnet substantially perpendicularly. Thus, magnetic force lines of the rotor magnet pass through the stator core at right angles and the magnetic force of the rotor magnet effectively influences rotational power.

Further, since a thickness of the stator core sheet forming the stator core in the bent portions is made thinner than that of other portions, no gap is generated in the salient pole teeth portions between the stator core sheets adjacent to each other when the stator core sheets pressed and bent with one mold are laminated. The magnetism property does not deteriorate, and no vibration and noise is generated.

Moreover, the position of the magnetism center of the stator core becomes easy to be set. A variance in the magnetism centers among the motors also becomes small. This enables an accurate adjustment of attractive forces.

BRIEF DESCRIPTION OF THE DRAWINGS

FIG. 13 is a cross-sectional view of a spindle motor of a first conventional example.

FIG. 14 is a plain view of a stator core of the spindle motor of a first conventional example.

FIG. 15A is a cross-sectional view of a spindle motor of a second conventional example; and FIG. 15B is a cross-sectional view of the stator core of the spindle motor of the second conventional example.

FIG. 16 is a partial cross-sectional view showing an exemplary bending working for the stator core of the second conventional example.

FIG. 17 is a partial cross-sectional view showing another example of bending working for the stator core of the second conventional example.

DESCRIPTION OF THE PREFERRED EMBODIMENTS

Hereinafter, preferred embodiments of a spindle motor according to the present invention will be described with reference to FIGS. 1 through 12.

Embodiment 1

Figure 1:
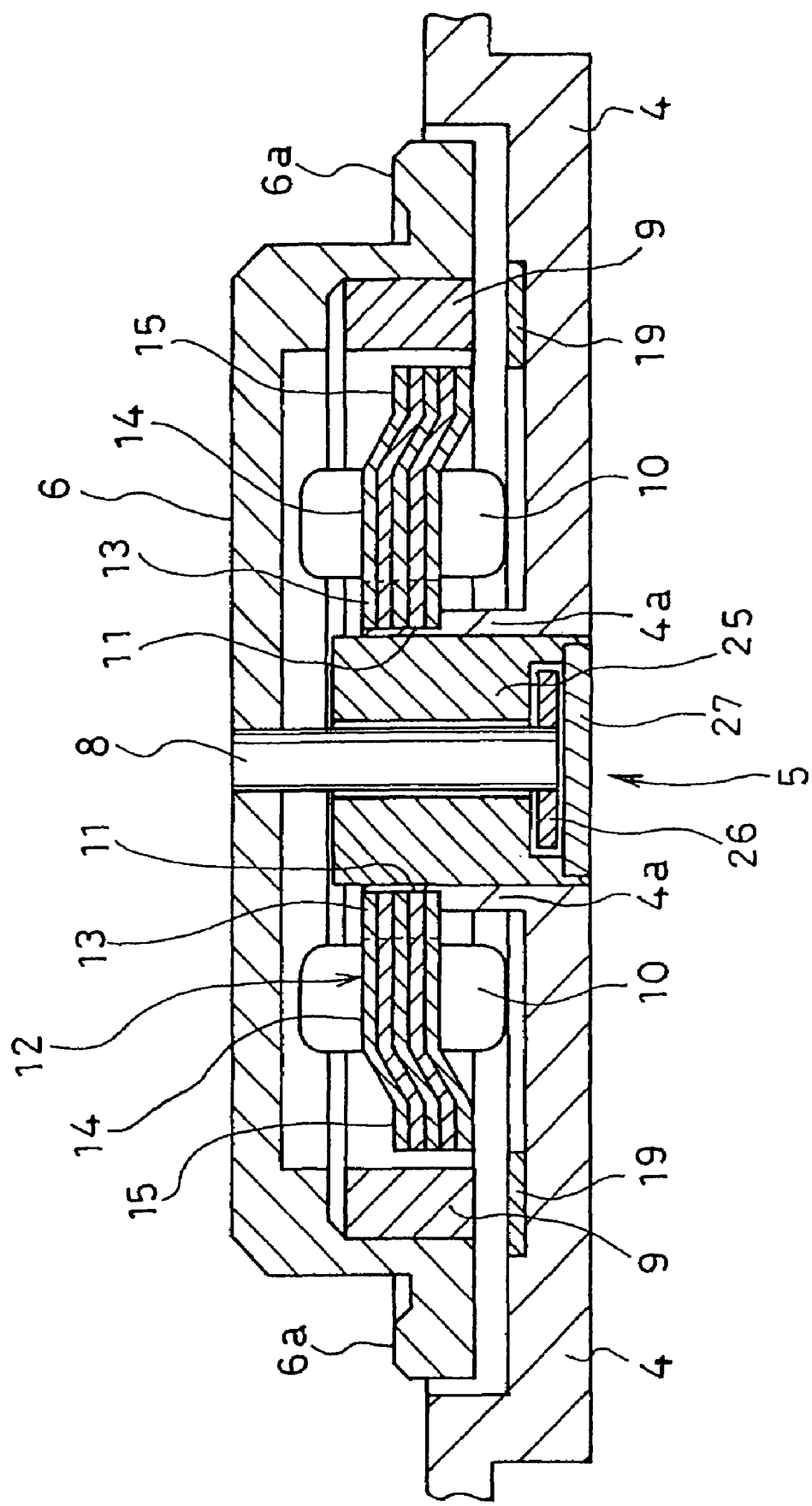
FIG. 1 is a cross-sectional view of a spindle motor according to Embodiment 1 of the present invention.
Figure 2:
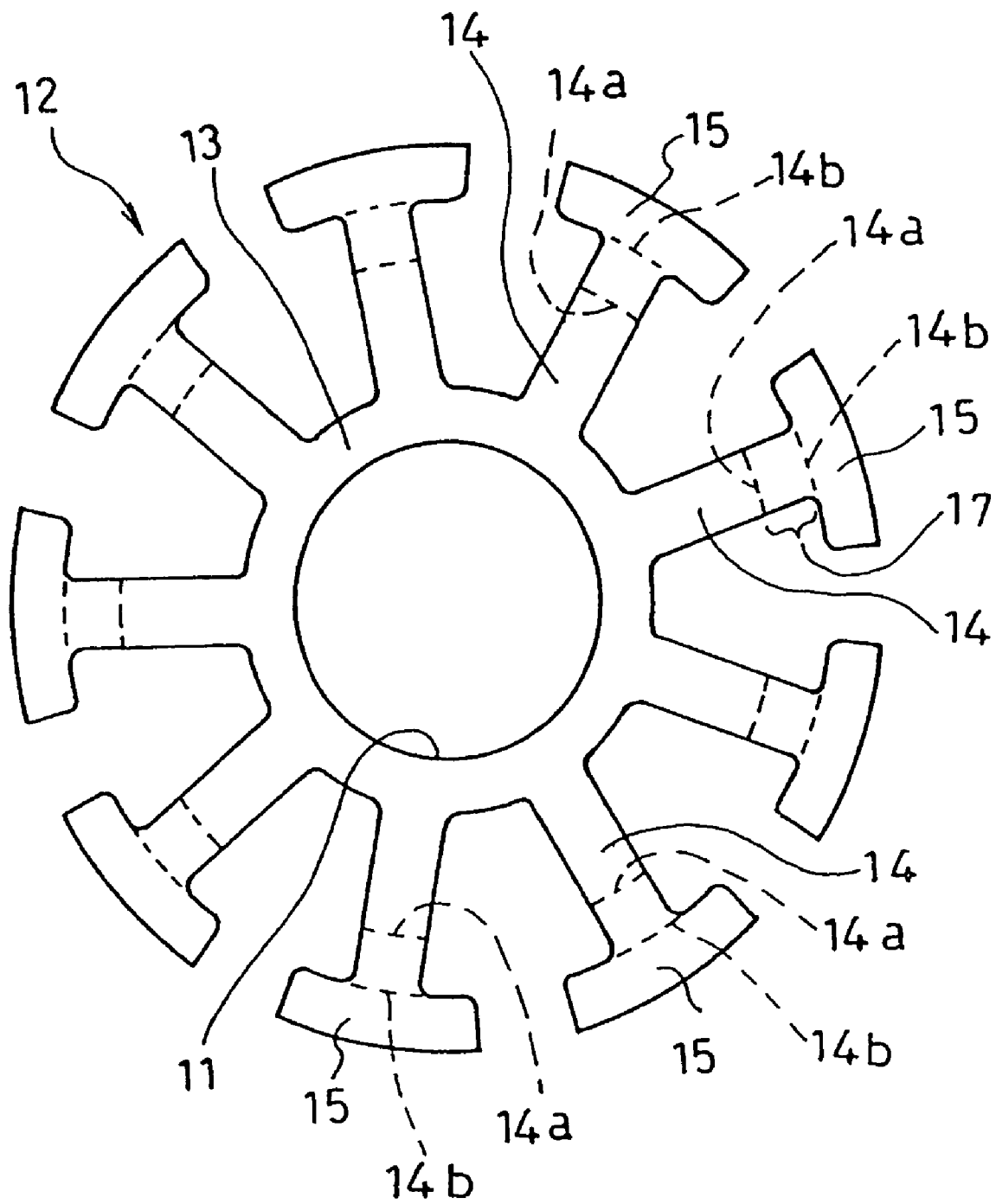
FIG. 2 is a plain view of a stator core of the spindle motor according to Embodiment 1 of the present invention.

FIG. 1 is a cross-sectional view of a spindle motor of an external rotor type according to Embodiment 1 of the present invention. As shown in FIG. 1, a base 4 which is a fixed portion of the spindle motor has a bearing support 4a of a tubular shape in its central portion. A bearing unit 5 is fixed into a hole of the bearing support 4a. The bearing unit 5 is a hydrodynamic bearing device of an axis-rotation type and supports a shaft 8 so as to be rotatable. To the shaft 8, a hub 6 having a plate-like shape is attached.

There are two types of hydrodynamic bearing devices: an axis-rotation type and an axis-fixed type. Both types can be applied to Embodiment 1. A radial bearing and a thrust bearing of the hydrodynamic bearing devices may have structures as described below. In the radial bearing, a sleeve is fitted to an outer periphery of an axis with a predetermined gap interposed therebetween, and a lubrication fluid is filled in the gap between the axis and the sleeve. A dynamic pressure groove is formed on at least one of the axis and the sleeve. In the thrust bearing, a flange member having a diameter larger than an axis diameter (or a rigid body having a flange function) is fixed to or integrally formed with at least one end of the axis. A lubrication fluid is filled in a gap between at least one end surface of the flange member in an axial direction and the end surfaces of the sleeve. A dynamic pressure groove is formed on at least one of the axis and the sleeve. In another structure of the thrust bearing, a flange body 26 having a diameter larger than an axis diameter or a rigid body having a flange function is fixed to or integrally formed with at least one end of the shaft 8. A lubrication fluid (not shown) is filled in a gap between at least one end surface of the flange member 26 in an axial direction and a thrust plate 27 blocking the sleeve or a blocking bottom surface of the sleeve. A dynamic pressure groove is formed on at least one of the axis and the sleeve. In yet another type of the structure, a lubrication fluid is filled in a gap between one of end surfaces of the axis and the thrust plate blocking the sleeve or the blocking end surface of the sleeve, and a dynamic pressure groove is formed on at least one of the axis and the sleeve. The flange body may be a part of a component which has other functions. The structure in which the dynamic pressure groove has a certain angle to the axial direction and a bearing serves as both the radial bearing and the thrust bearing may also be used.

For example, a magnetic disc or an optical disc is attached to a disc receiving surface 6a of the hub 6. A rotor magnet 9 to be a rotor of the spindle motor is attached to an internal wall surface of an outer periphery of the hub 6. If the base 4 is formed of a non-magnetic material, an attractive plate 19 is provided on an upper surface of the base 4 where it faces the rotor magnet 9. The attractive plate 19 is formed of a magnetic material, and attracts the hub 6 in a downward direction with a magnetic force of the rotor magnet 9 such that a variance in the position of the rotor in an axial direction is maintained within a certain range irrespective of a change in the position of the spindle motor.

Figure 3A:
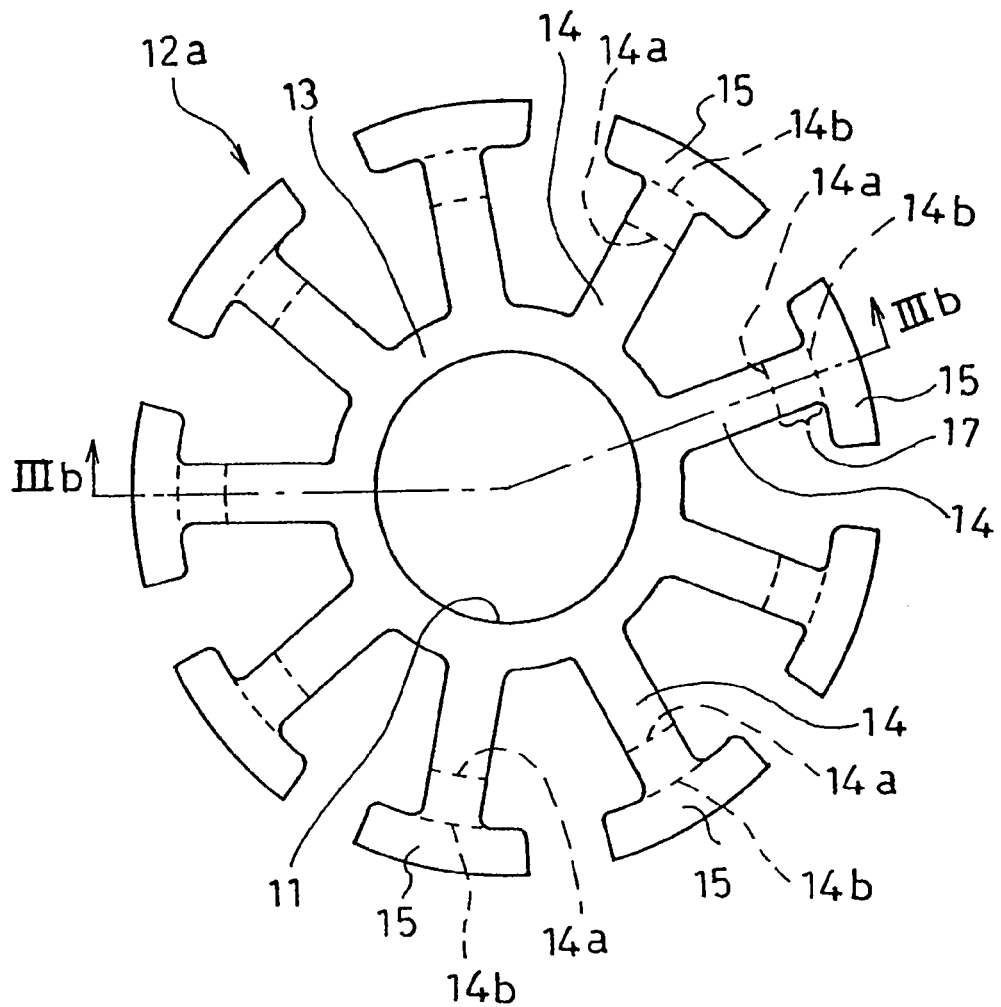
FIG. 3A is a plain view of a stator core sheet forming the stator core of the spindle motor according to Embodiment 1 of the present invention.
Figure 3B:
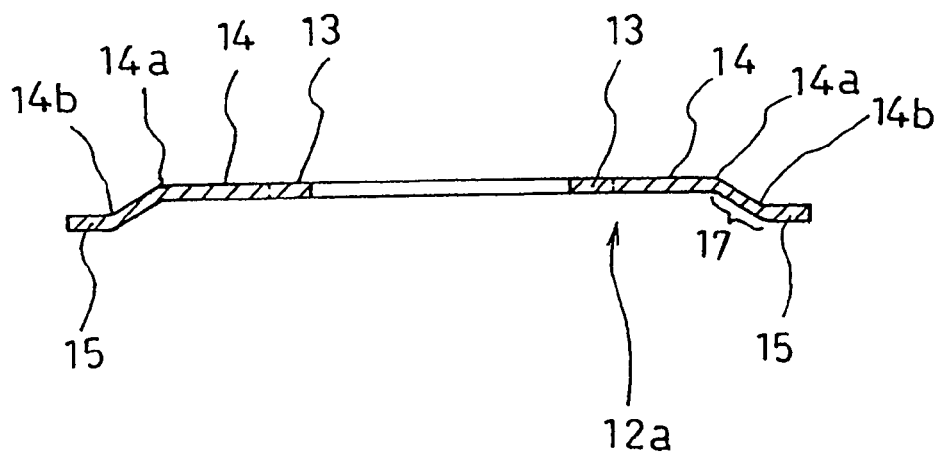
FIG. 3B is a cross-sectional view cut along line IIIb-IIIb shown in FIG. 3A.

A stator core 12 having a salient pole shape is provided on an outer peripheral portion 11 of the bearing support 4a of the base 4. As shown in a plain view of FIG. 2, the stator core 12 includes a yoke portion 13, a plurality of salient pole arm portions 14 protruding from the yoke portion 13 in a radial direction, and teeth portions (salient pole teeth portions) 15 integrally formed with tip portions of the salient pole arm portions 14. The stator core 12 may be formed by, for example, laminating five layers of stator core sheets 12a. The stator core sheets 12a are formed by, for example, punching thin magnetic material plates each having a thickness of 0.2 mm into a shape shown in FIG. 3A. As shown in FIG. 3B which is a cross-sectional view cut along line IIIb-IIIb in FIG. 3A, the stator core sheet 12a is bent along bending lines 14a indicated by a broken line in the salient pole arm portions 14 to have a hill fold, and is bent along bending lines 14b indicated by broken lines in a border between the salient pole arm portions 14 and the teeth portions 15 to have a valley fold. Bending directions and bending angles are set such that the yoke portion 13 and the teeth portions 15 are substantially parallel to each other when the stator core sheet 12a is bent along the bending lines 14a and 14b. With this structure, in the spindle motor of Embodiment 1, the teeth portions 15 of the stator core 12 face the surface of the rotor magnet 9 at right angles. Thus, an air gap between the stator core 12 and the rotor magnet 9 does not relatively expand and a magnetic force of the rotor magnet 9 can be effectively utilized.

In the spindle motor according to Embodiment 1, a thickness (plate thickness) of bent portions 17 between the bending lines 14a and 14b of the salient pole arm portions 14 of the stator core sheet 12a shown in FIG. 3 is made thinner than that of other portions as described below in detail.

Figure 4A:
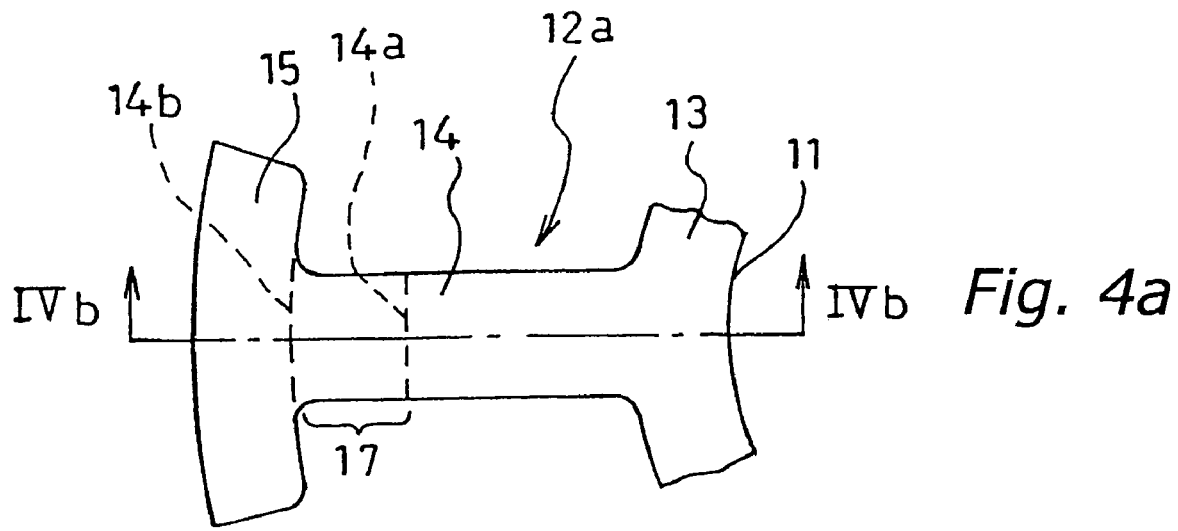
FIG. 4A is a partial plain view of the stator core sheet.
Figure 4B:
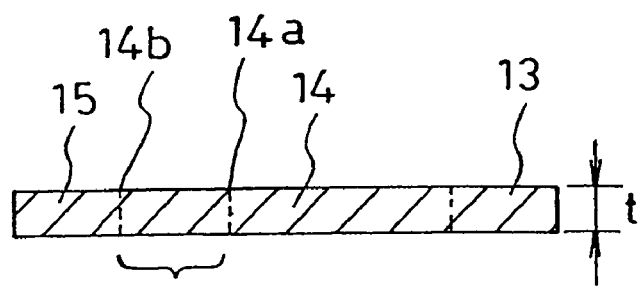
FIG. 4B is a cross-sectional view cut along line IVb-IVb in FIG. 4A.
Figure 4C:
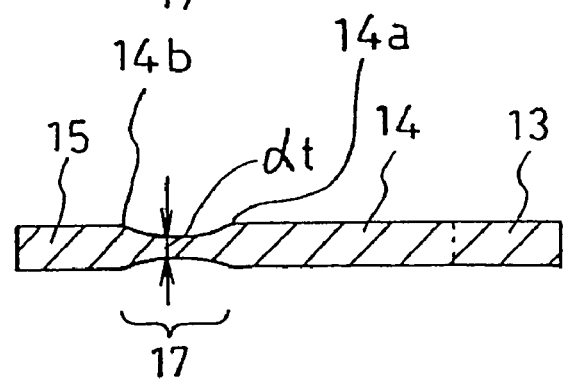
FIG. 4C is a cross-sectional view showing bent portions 17 of FIG. 4B being thinned.
Figure 4D:
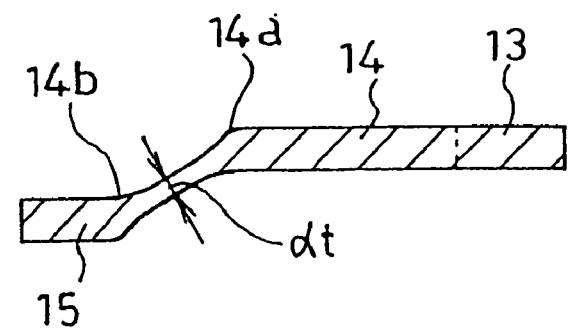
FIG. 4D is a cross-sectional view showing bent portions 17 of FIG. 4C being bent.

FIG. 4A is a partial plain view showing only one of the salient pole arm portions 14 and the teeth portions 15 of the stator core sheet 12a of FIG. 3. FIG. 4B is a cross-sectional view cut along line IVb-IVb in FIG. 4A. The plate thickness of the stator core sheet 12a is represented by "t". A bent portion 17 between the bending lines 14a and 14b of the stator core sheet 12a punched into the shape of FIG. 4A is compressed by, for example, press working so as to have a thinner plate thickness as shown in FIG. 4C. The thinned plate thickness is represented by $\alpha \cdot t$. $\alpha$ is a value within the range of 0.5 to 0.9. Next, as shown in FIG. 4D, the stator core sheet 12a is bent along the bending lines 14a and 14b to complete the process. Five layers of the stator core sheets 12a obtained by the process illustrated in FIGS. 4A through 4D are laminated to obtain the stator core 12 shown in FIG. 5.

Figure 5:
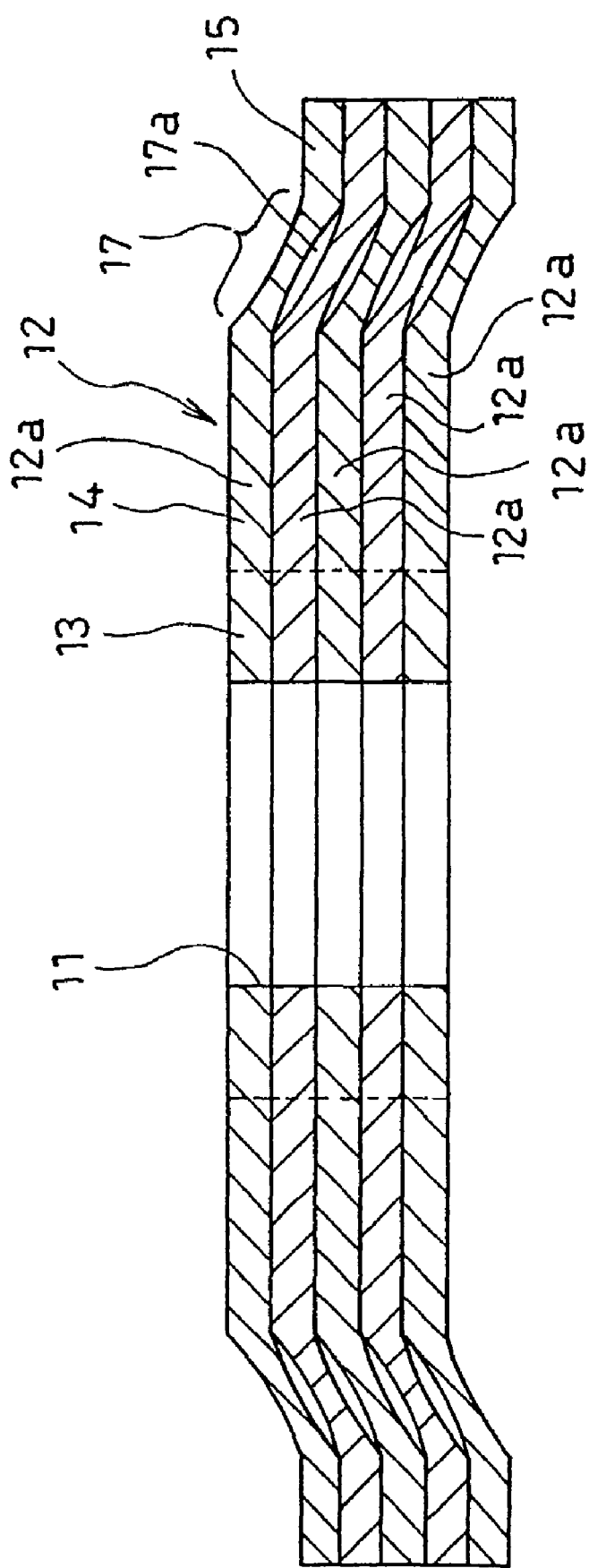
FIG. 5 is a cross-sectional view of the stator core according to Embodiment 1.

In the stator core 12 of Embodiment 1, the plate thickness of the bent portions 17 of the stator core sheets 12a is made thinner than that of other portions so that an overlap portion of the stator core sheets 12a corresponding to the overlap portion 128 of FIG. 17 can be removed. As a result, as shown in FIG. 5, even when a plurality of the stator core sheets 12a are laminated and adhered closely to each other in their planar portions, no gap is generated in the teeth portions 15 between the stator core sheets 12a adjacent to each other. In the stator core sheet 12a shown in FIG. 5, the plate thickness is made thin to an extent that gaps 17a are generated in the bent portions 17 between the stator core sheets 12a adjacent to each other. When the plate thickness of the stator core sheets 12a is represented by t and the thickness of the central portions of the bent portions 17 is represented by $\alpha \cdot t$ ($\alpha$ is a value of 0.5 or higher and 0.9 or lower), if the value of $\alpha$ is higher than 0.9, it is inevitable that a gap is generated in the teeth portions 15 between the stator core sheets 12a adjacent to each other. If the value of $\alpha$ is below 0.5, magnetism saturation may occur due to a decrease in cross sections of the bent portions 17. This may cause Kt value to decrease and also vibration and noise to be generated. The present inventors tried different values of $\alpha$ to study the results, and confirmed that preferable results can be achieved when the value of $\alpha$ is within the range of 0.5 to 0.9. More preferably, the value of $\alpha$ is within the range of 0.7 to 0.8.

Figure 11:
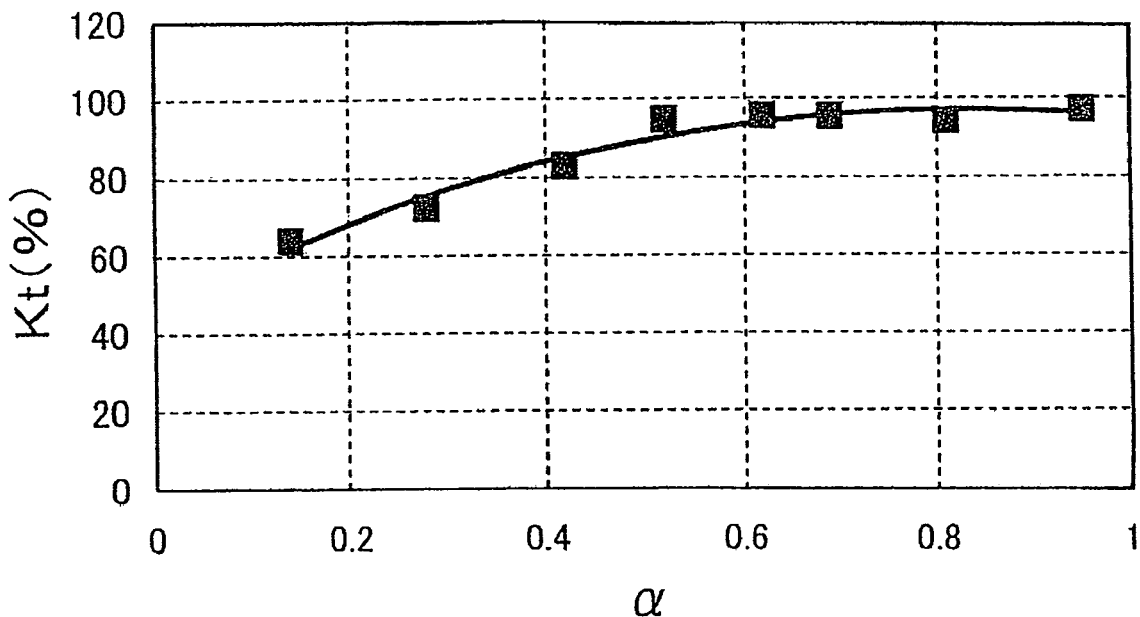
FIG. 11 is a graph showing the relationship between the value of α and Kt (torque constant).

FIG. 11 is a graph showing the relationship between the value of $\alpha$ and torque constants Kt (%). In FIG. 11, torque constant Kt when the stator core is not bent and the value of $\alpha$ is 1 is assumed to be 100% (reference value). As can be seen from FIG. 11, Kt is 95% or higher when the value of $\alpha$ is within the range of 0.5 to 0.9. Deviation from the reference value is small.

Figure 12:
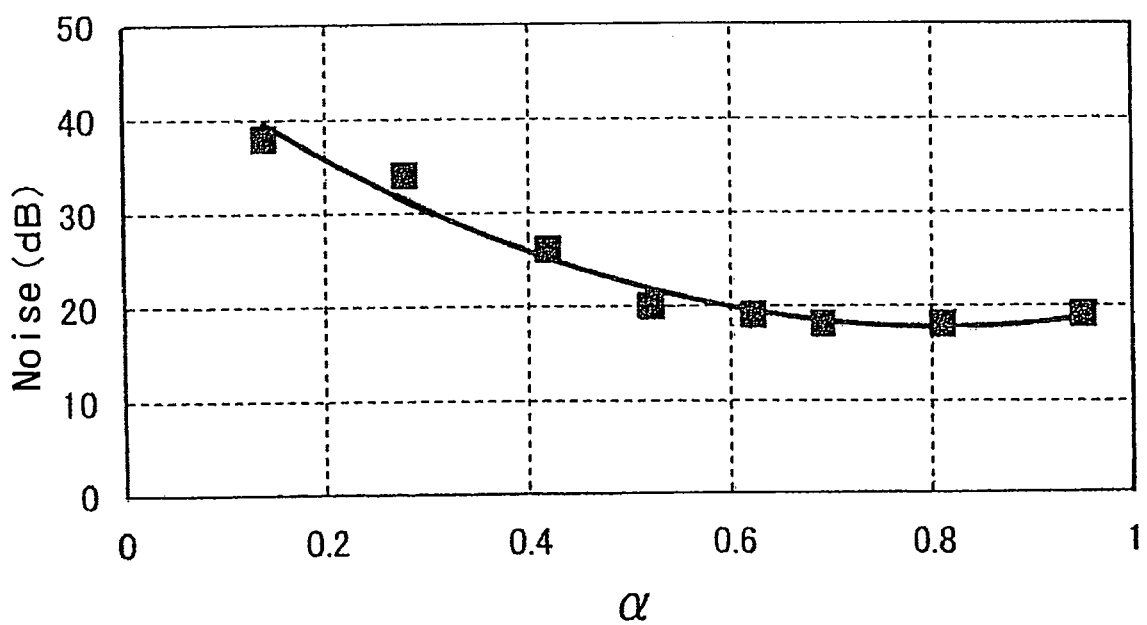
FIG. 12 is a graph showing the relationship between the value of α and a noise.

FIG. 12 is a graph showing the relationship between the value of $\alpha$ and a noise (dB). As can be seen from FIG. 12, a noise hardly increases when the value of $\alpha$ is within the range of 0.5 to 0.9.

Figure 6A:
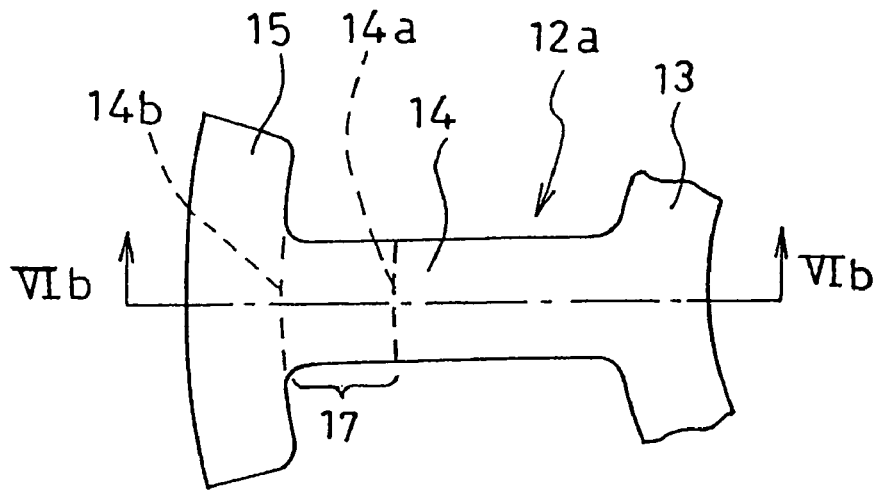
FIG. 6A is a partial plain view of the stator core sheet same as FIG. 4A.
Figure 6B:
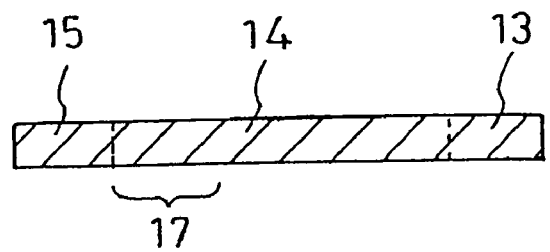
FIG. 6B is a cross-sectional view cut along line VIb-VIb in FIG. 6A.
Figure 6C:
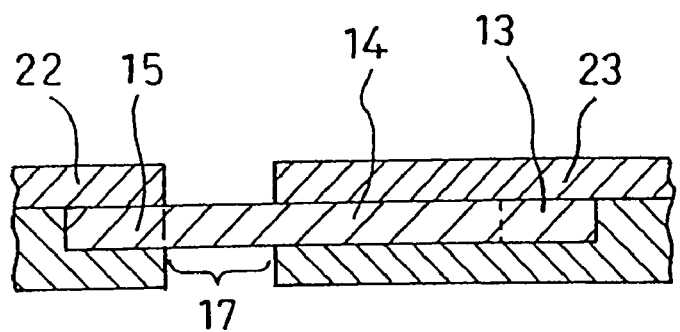
FIG. 6C is a cross-sectional view showing the stator core sheet having both ends being held by clamping jigs 22 and 23.
Figure 6D:
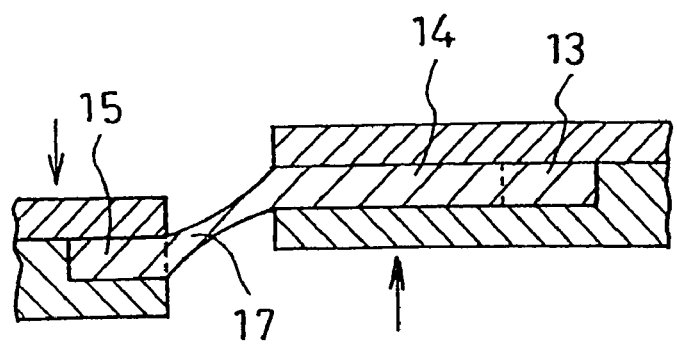
FIG. 6D is a cross-sectional view showing the stator core sheet with the bent portions 17 being bent by moving the clamping jigs 22 and 23 in a vertical direction.

The plate thickness of the bent portions 17 can be made thinner using methods other than the press working. In the example shown in FIG. 6, both ends of the bent portions 17 are held with clamping jigs 22 and 23 as shown in FIG. 6C and they are moved in vertical direction as shown in FIG. 6D. In this way, the bent portions 17 are drawn out to have a thinner plate thickness, and a bend working is performed at the same time.

The present inventors have studied the relationship between the value of α and the properties of the spindle motor for the stator core 12 of the spindle motor of Embodiment 1 with different values of "α" which defines the thickness of the bent portions 17 of the stator core sheet 12a. The results are shown in FIGS. 7A through 7C.

Figure 7A:
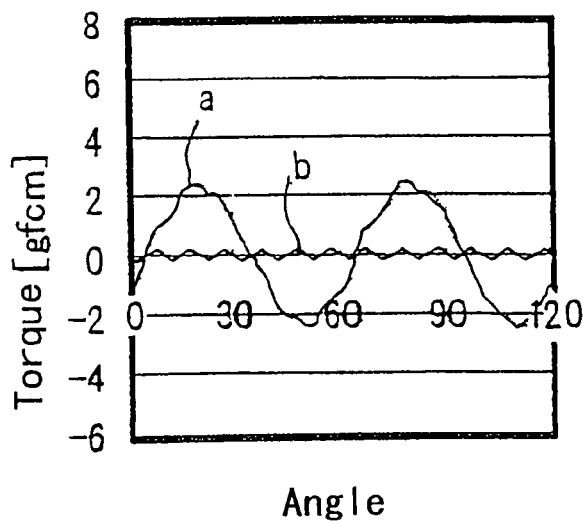
FIGS. 7A through 7C are graphs showing the relationship between a rotation angle of the hub and a torque.
Figure 7B:
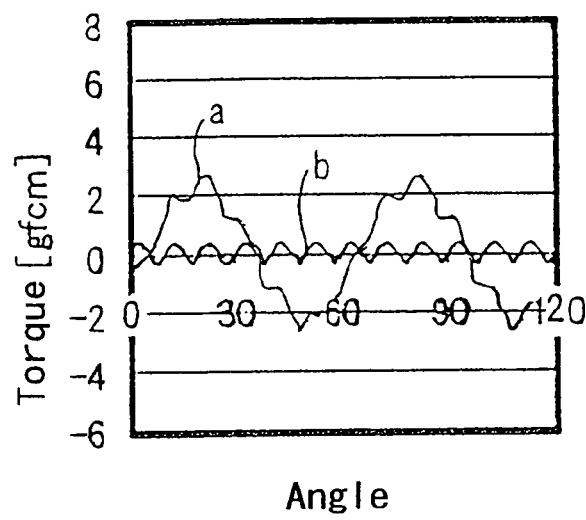
Figure 7C:
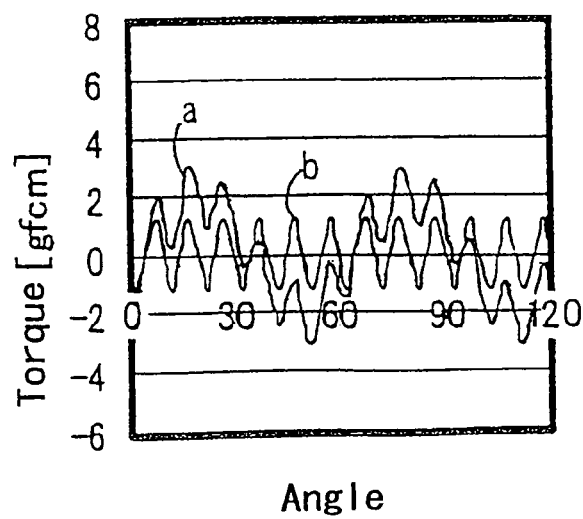

FIGS. 7A through 7C are graphs in which a horizontal axis shows a rotation angle of the hub 6 of the spindle motor according to the present invention and a vertical axis shows a torque. Curve a represents changes in a torque and curve b represents changes in a cogging component. FIG. 7A is a graph where the value of α is about 0.9. There is a small distortion in a waveform showing changes in the torque and there is a small amount of cogging component.

FIG. 7B is a graph when the value of α is 0.7. There is more distortion in the waveform showing torque changes and the cogging component increases. Preferably, the torque waveform is a sine wave and, ideally, no cogging waveform exists. However, as the spindle motor becomes smaller, there is less space for realizing a magnetic circuit design which satisfies ideal conditions. In practice, to include harmonic waves to some extent is inevitable. In Embodiment 1, α of 0.7 or higher is practically preferable. FIG. 7C is a graph where the value of α is about 0.45. There is a large distortion in the waveform showing the torque changes and a large cogging component. Thus, such a value is not preferable. In this embodiment, a stator of a motor having a outer diameter of φ21 to 22 (mm), an inner diameter of φ13 to 14 (mm), and a thickness t of 0.7 to 0.8 (mm) was used. It was found that the same tendency is shown if a stator having an outer diameter of φ17 to 18 (mm) and an inner diameter of φ9.5 to 10.5 (mm) is used.

In the spindle motor according to Embodiment 1, the stator core 12 is bent in bent portions 17 as shown in FIGS. 1 and 3. Thus, a gap between the salient pole arm portions 14 and the base 4 becomes large. Therefore, the number of turns of the windings 10 wound around the stator core 12 can be increased. As a result, a large torque can be achieved. Also, the teeth portions 15 of the stator core 12 face the surface of the rotor magnet 9 at right angles. Thus, the air gap between the stator core and the rotor magnet is not expanded, and a magnetic force of the magnet can be effectively utilized. Further, in Embodiment 1, the thickness of the stator core sheets 12a which form the stator core 12 is made thinner in bent portions 17. In this way, when a plurality of the stator core sheets 12a formed using bend working using one press mold are laminated, the stator core sheets 12a can adhere closely to each other without a gap being generated in the teeth portions 15. Therefore, a noise due to vibration of the stator core sheets 12a during operation is not produced. Deterioration of the magnetism property and increase in power loss due to the gap can also be prevented.

Embodiment 2

Figure 8:
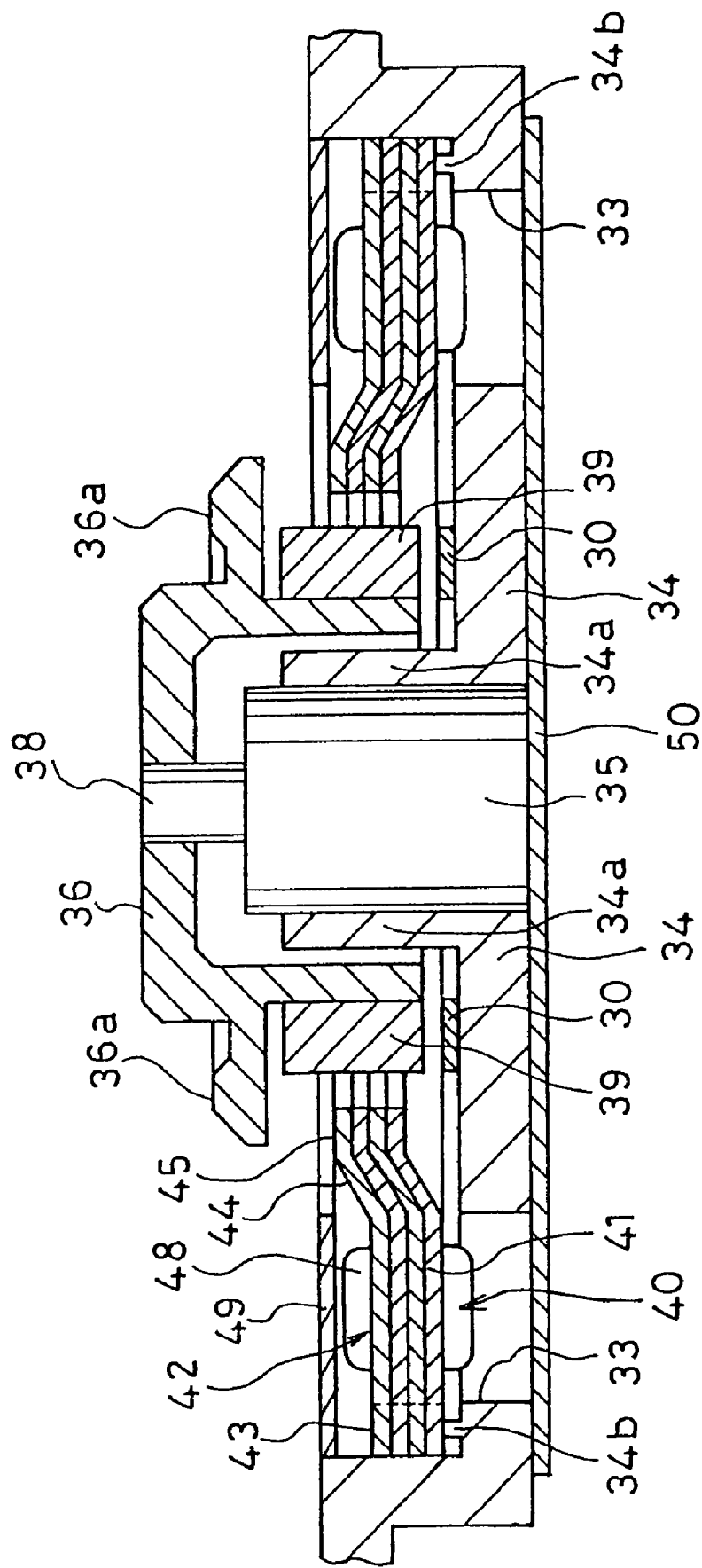
FIG. 8 is a cross-sectional view of the spindle motor according to Embodiment 2 of the present invention.

The spindle motor according to Embodiment 2 of the present invention will be described with reference to FIGS. 8 and 9. Embodiment 2 relates to a spindle motor of an internal motor type. FIG. 8 is a cross-sectional view of the spindle motor. In FIG. 8, a base 34 which is a fixed portion of the spindle motor has a bearing support 34a in its central portion and has a bearing unit 35 fixed to a hole of the bearing support 34a. The bearing unit 35 supports a shaft 38 so as to be rotatable. To the shaft 38, a hub 36 is attached. For example, a magnetic disc or an optical disc is attached to a disc receiving surface 36a of the hub 36. A rotor magnet 39 is attached to the hub 36.

A stator core 40 is provided on a support 34b in an outer peripheral portion of the base 34. As shown in a plain view of FIG. 9A, the stator core 40 includes nine salient pole arm portions 42 protruding from a yoke portion 43 having a ring shape in an inward direction. The spindle motor is a motor with nine poles. Teeth portions (salient pole teeth portions) 45 are integrally formed with respective inner peripheral ends of the salient pole arm portions 42.

Figure 9A:
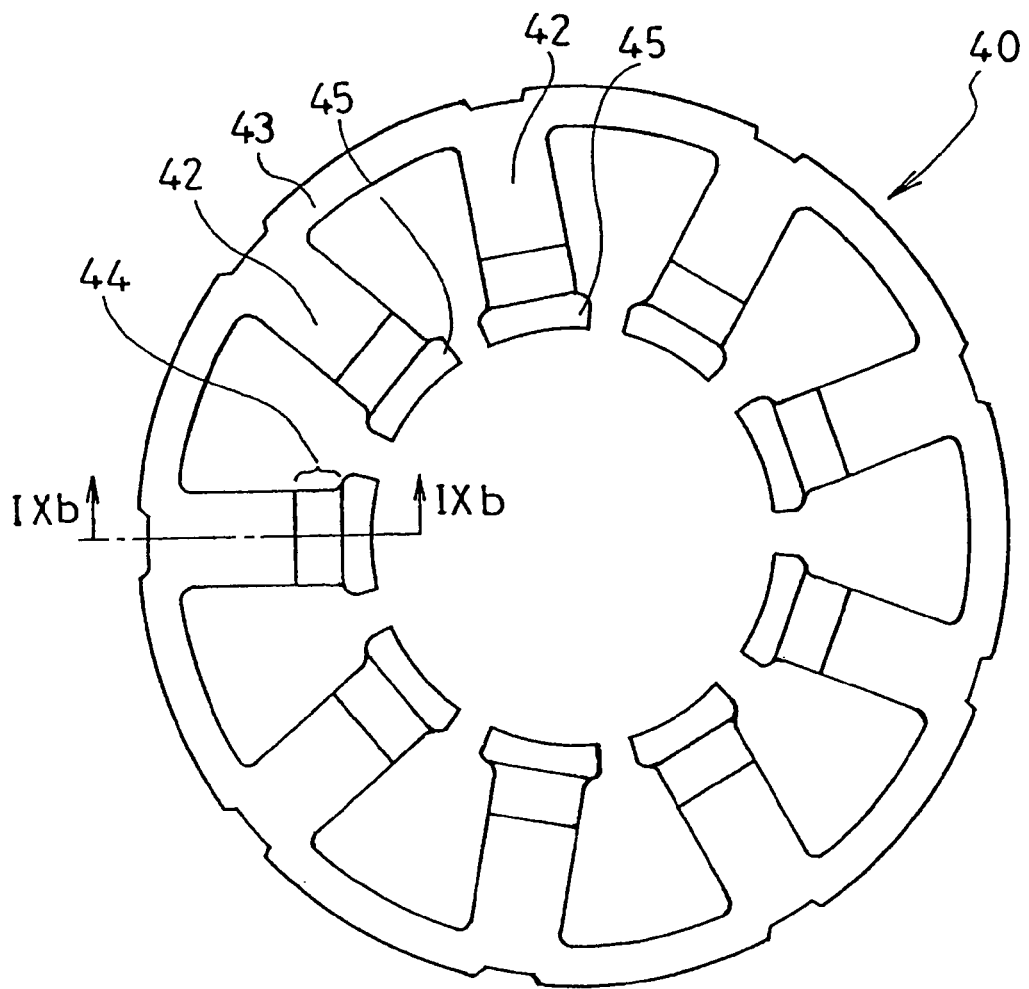
FIG. 9A is a plain view of a stator core sheet of the spindle motor according to Embodiment 2 of the present invention.
Figure 9B:
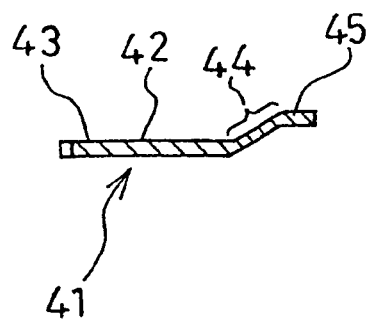
FIG. 9B is a cross-sectional view cut along line IXb-IXb shown in FIG. 9A.

The stator core 40 shown in FIG. 9A is formed by, for example, laminating stator core sheets 41 formed by punching thin plates of a magnetic material having a thickness of about 0.2 mm. FIG. 9B is a cross-sectional view of one of the stator core sheets 41 of the stator core 40 cut along line IXb-IXb shown in FIG. 9A. As shown FIG. 9B, the teeth portions 45 are bent and tip portions of the teeth portions 45 face a surface of the rotor magnet 39 substantially perpendicularly.

In the stator core sheets 41 of the spindle motor according to Embodiment 2, as in the stator core sheet 12a of Embodiment 1, the plate thickness of bent portions 44 of the stator core sheet 41 is made thinner than that of other portions. When it is assumed that the thickness of the other portions of the stator core sheets 41 is "t", the thickness of the bent portions 44a is α·t (α is a value within the range of 0.5 to 0.9). With this structure, it becomes possible to prevent a gap from being generated in the teeth portions 45 between the stator core sheets 41 adjacent to each other.

A conductor is wound around each of the salient pole arm portions 42 of the stator core 40 to form a winding 48. In the spindle motor according to Embodiment 2, well-known openings 33 (see, for example, Japanese Laid-Open Utility Model Publication No. 62-168781) are provided in the portions of the base 34 which are below the windings 38. The windings 48 are respectively wound around nine salient pole arm portions 42. Thus, nine openings 33 are provided. Nine windings 48 are connected as Y connection or Δ connection in the case of a three phase motor.

In the spindle motor according to Embodiment 2 shown in FIG. 8, the bent portions 44 are provided in the stator core 40 and the teeth portions 45 face the rotor magnet 39 at right angles. Further, the salient pole arm portions 42 are located in a lower part of FIG. 8. Thus, the windings 48 may be located in the lower part. As a result, it becomes possible to make a distance between the disc receiving surface 36a and the windings 48 larger, and to reduce magnetic influence of the windings 48 on a magnetic disc to be attached to the disc receiving surface 36a and a magnetic head seeking on the magnetic disc without compromising the torque properties. Furthermore, by providing a magnetic shield plate 49 having a ring shape on the windings 48, lines of magnetic force leaking out from the windings 48 can be blocked to significantly reduce magnetic influence on a magnetic disc and the like. By providing openings in portions of the base 34 which faces the windings 48, the number of turns can be increased to an extent that lower parts of the windings enter the openings. With this structure, a larger torque can be obtained with a spindle motor which has a restriction on the dimension. In other words, a small and light spindle motor with a large torque can be realized.

In the case where a material of the base 34 is a non-magnetic material, an attractive plate 30 made of a magnetic material such as an iron plate is attached on a surface of the base 34 which faces the rotor magnet 39. With a magnetic force generated between the rotor magnet 39 and the attractive plate 30, it becomes possible to try to prevent positional changes of the hub in an axial direction due to positional changes of the motor.

A seal member 50 for blocking the openings 33 is adhered to a lower surface of the base 34 in order to prevent foreign substances such as dust from entering the openings 33. A model number or the like of the spindle motor may be printed on the sealing member 50 so that it can be used as an inscription plate. In Embodiment 2, similar effects as those of the spindle motor of an external rotor type according to Embodiment 1 can be achieved with a spindle motor of an internal rotor type.

Embodiment 3

A spindle motor according to Embodiment 3 of the present invention will be described with reference to FIG. 10. Embodiment 3 relates to a spindle motor of an internal rotor type. The spindle motor has a stator core 60 which has a different structure from that of the stator core 40 of the spindle motor according to Embodiment 2 as shown in FIG. 8. However, other components are the same as those shown in FIG. 8. Therefore, elements same as those in FIG. 8 are denoted by the same reference numerals and overlapping explanation is omitted.

Figure 10:
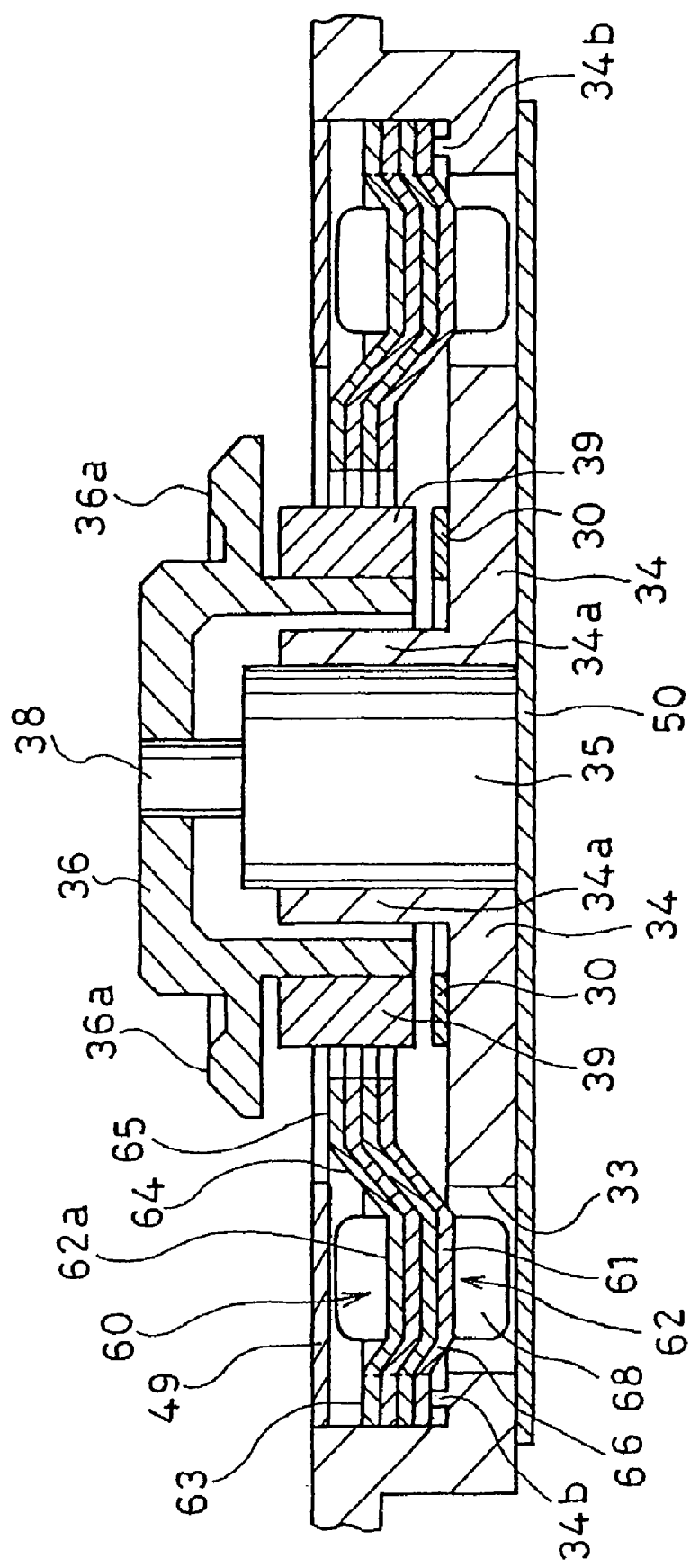
FIG. 10 is a cross-sectional view of the spindle motor according to Embodiment 3 of the present invention.

As shown in FIG. 10, the stator core 60 has a shape similar to that of the stator core 40 shown in FIG. 9A except for the shape around a yoke portion 63. A structure of the yoke portion 63 will be described below in detail.

The stator core 60 is fixed to the base 34 with a lower end surface of the yoke portion 63 being supported by a supporting portion 34b provided on the base 34. A first bent portion 66 is formed between the yoke portion 63 and a salient pole arm portion 62. The first bent portion 66 has a similar shape as that of the bent portion 44 shown in FIG. 9B. The thickness of each of stator core sheets 61 forming the stator core 60 is made thinner in the first bent portion 66 than in other portions. The thickness of the first bent portion 66 is represented by "α·t". α is a value within the range of 0.5 to 0.9. t is the thickness of a stator core sheet 61.

A second bent portion 64 is provided between the salient pole arm portion 62 and the teeth portion 65. The second bent portion 64 has a shape substantially similar to that of the second bent portion 44 of Embodiment 2 shown in FIG. 8.

In the spindle motor according to Embodiment 3 shown in FIG. 10, the first bent portion 66 and the second bent portion 64 are formed in the stator core 60. Thus, the salient pole arm portion 62 around which the windings 68 are wound locates in a lower part of the figure. Specifically, as can be seen by comparing the stator core 60 shown in FIG. 10 to the stator core 40 shown in FIG. 8, a lower portion of the stator core 60 is in the openings 33 of the base 34 in FIG. 10. As the salient pole arm portion 62 of the stator core 60 is brought close to the base 34, a gap between an upper end surface 62a of the salient pole arm portion 62 and the magnetic shield plate 49 can be made larger. As a result, the number of turns of the windings 68 wound around the salient pole arm portion 62 can be increased. In order to maximize the number of turns of the windings 68, it is preferable to set bending angles of the first bent portion 66 and the second bent portion 64 such that the salient pole arm portion 62 locates in approximately halfway between the magnetic shield plate 49 and the seal member 50. The dimension of the spindle motor of Embodiment 3 is substantially the same as the dimension of the spindle motor of Embodiment 2. However, the spindle motor according to Embodiment 3 further includes a feature that the number of turns of the windings 68 of the stator core 60 can be made larger than that of Embodiment 2 in addition to other features of the spindle motor according to Embodiment 2. Therefore, the spindle motor according to Embodiment 3 can achieve a torque larger than that of the spindle motor of Embodiment 2.

The present invention is applicable to the spindle motors for rotating magnetic discs and optical discs.

What is claimed is:

1. A spindle motor comprising:
   a rotor magnet supported by a hydrodynamic bearing device so as to be rotatable;
   a stator core formed by laminating a plurality of magnetic material plates which have salient pole teeth portions facing the rotor magnet with a predetermined gap interposed therebetween, salient pole arm portions which is connected to the salient pole teeth portions, and a yoke portion connected to the salient pole arm portions and fixed to a base; and
   windings wound at least around the salient pole arm portions of the stator core,
   wherein the plates of the magnetic material of the stator core has the salient pole teeth portions facing an opposing surface of the rotor magnet substantially perpendicularly, being bent at first bent portions between the salient pole teeth portions and the salient pole arm portions such that the salient pole teeth portions and the salient pole arm portions are substantially parallel, and a thickness of the first bent portions of the plates is made thinner than that of other portions, and
   the plates are bent at second bent portions between the yoke portions and the salient pole arm portions such that the yoke portion and the salient pole arm portions are substantially parallel, and a thickness of the second bent portions of the plates is made thinner than that of other portions; and
   the plurality of magnetic material plates are laminated such that gaps are generated above and below the first and second bent portions.

2. A spindle motor according to claim 1, wherein the respective thicknesses of the first bent portions and the second bent portions of the plates of the stator core are within the range of 0.5 times to 0.9 times that of other portions.

3. A spindle motor according to claim 1, wherein the stator core is an external rotor type which is provided on an inner peripheral side of the rotor magnet.

4. A spindle motor according to claim 1, wherein the stator core is an internal rotor type which is provided on an outer peripheral side of the rotor magnet.

* * * * *